United States Patent [19]

Milletics

[11] Patent Number: 5,072,503
[45] Date of Patent: Dec. 17, 1991

[54] METHOD FOR DISASSEMBLING AN INNER SOCKET ASSEMBLY

[75] Inventor: Michael L. Milletics, Enhaut, Pa.

[73] Assignee: Milletics, Bell and Clower, Enhaut, Pa.

[21] Appl. No.: 462,144

[22] Filed: Jan. 8, 1990

[51] Int. Cl.$^5$ .............................................. B23P 19/00
[52] U.S. Cl. ..................................... 29/426.5; 29/426.1
[58] Field of Search ............................ 29/426.1, 426.5

[56] References Cited

U.S. PATENT DOCUMENTS

| | | | |
|---|---|---|---|
| 3,074,735 | 1/1963 | Ulrich | 280/96 |
| 3,605,934 | 9/1971 | Millard | 180/79.2 R |
| 3,861,250 | 1/1975 | Zugai | 29/426.5 X |
| 3,890,692 | 6/1975 | Jandura, Jr. | 29/426.5 |
| 4,100,663 | 7/1978 | Crum | 29/426.1 |
| 4,572,035 | 2/1986 | Eisenhauer | 29/426.5 X |
| 4,642,866 | 2/1987 | Murtaugh | 29/426.5 X |
| 4,663,814 | 5/1987 | Beck | 29/426.5 X |
| 4,914,798 | 4/1990 | Gentile | 29/426.5 |
| 4,922,599 | 5/1990 | Durfee | 29/426.5 X |

*Primary Examiner*—Timothy V. Eley
*Assistant Examiner*—C. Richard Martin
*Attorney, Agent, or Firm*—Philip D. Freedman

[57] ABSTRACT

An inner socket assembly and a rack and pinion steering mechanism of a vehicle comprises a rack having spaced-apart open axial ends; a rack tube projecting through the rack axially thereof and having end projecting beyond an axial end, the projecting end having outwardly directed threads; a hexagonal ball and socket joint housing with inward directed threads threaded with the outward directed threads of the rack tube end; a bulkhead within the housing dividing the housing into two chambers, a first chamber encompassing a threaded end of the rack tube, and a second chamber forming an inner socket; a tie rod with first ball-shaped end fitted within said inner socket to form a ball and socket joint and second end rotatably attached to a knuckle arm. A method for disassembling the inner socket assembly from the rack and pinion mechanism comprises disengaging the tie rod from the knuckle arm; encircling the tie rod with an adapter socket sleeve; advancing the adapter socket sleeve transversely along the length of the tie rod from the knuckle joint end to the ball end at the ball and socket joint housing; engaging the ball and socket joint housing with the first end of the adapter socket sleeve; encircling the tie rod with an elongated cylindrical shaft; advancing the elongated cylindrical shaft transversely along the length of the tie rod from the knuckle joint end toward the ball and socket joint; engaging a first end of the cylindrical shaft to a second end of the adapter socket sleeve and applying a torque force to the second end of the cylindrical shaft to rotate both the shaft and adapter socket sleeve whereby the ball joint housing is rotated, loosened and removed from the rack tube.

6 Claims, 4 Drawing Sheets

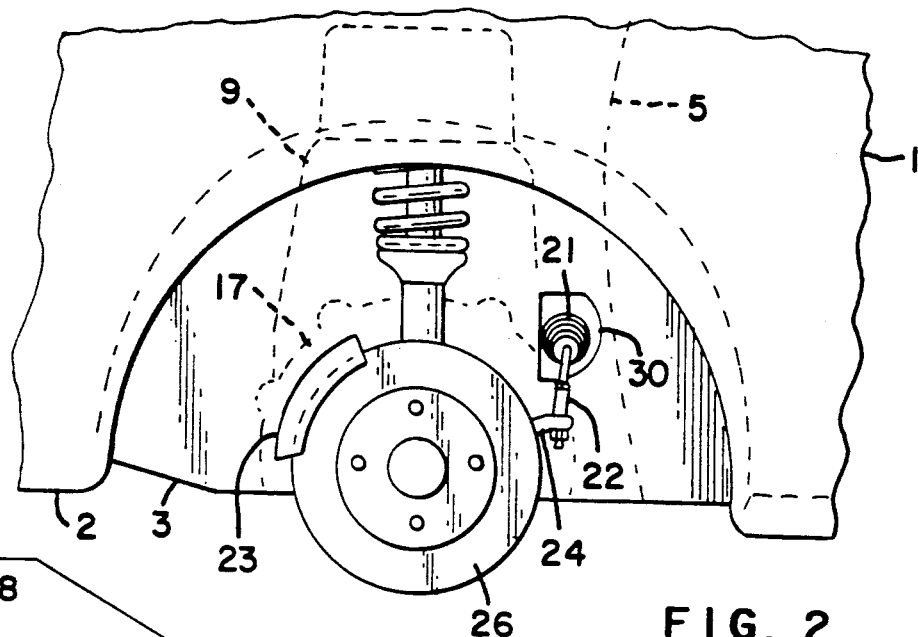
FIG. 2
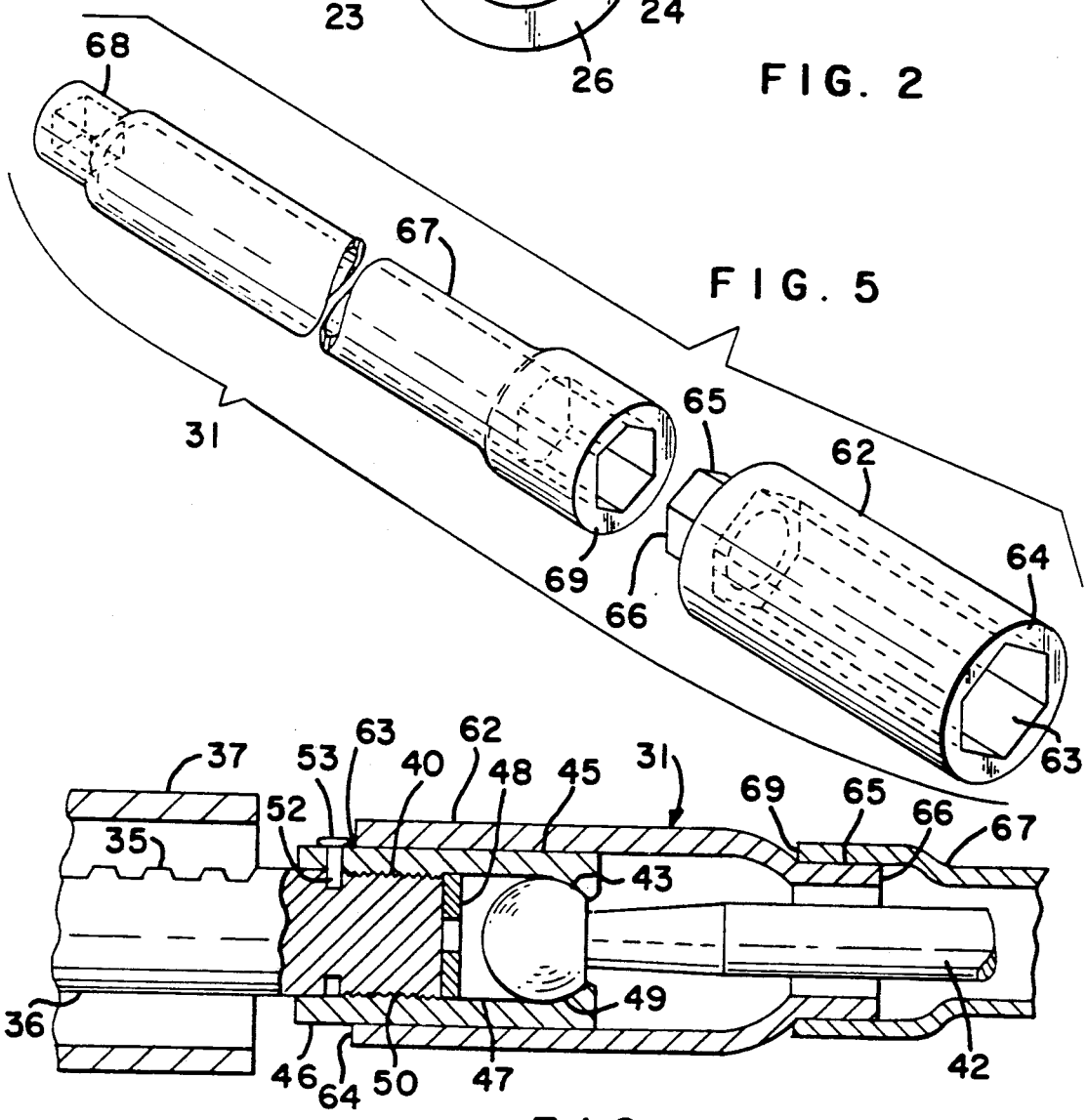
FIG. 5
FIG. 6

METHOD FOR DISASSEMBLING AN INNER SOCKET ASSEMBLY

FIELD OF THE INVENTION

This invention relates to a method and tool for disassembling the inner socket assembly of a rack and pinion steering mechanism.

BACKGROUND OF THE INVENTION

In known constructions of rack and pinion steering mechanisms, the inner rack tube is slidable, by rotation of the pinion, within a casing formed by an outer rack. Ends of the inner rack project from the casing and are connected to joints, for example, ball joints, which form part of a steering linkage to the steering road wheels. This steering linkage involves a ball and socket joint formed by a ball joint housing which has two chambers. A first chamber has inner threads and is threaded to a complimentary threaded end of the rack tube. A second chamber forms a socket and encompasses the ball end of a tie rod to form the ball and socket joint. At an opposing end, the tie rod is attached through a rotating joint to a knuckle arm which in turn is attached to a steering spindle which rotatably supports a wheel of the motor vehicle. The ball and socket joint and tie rod make up an inner socket assembly.

Repair of the rack and pinion steering or of the tie rod oftentimes requires disassembly of the inner socket assembly by disengagement of the tie rod at the ball and socket joint by unthreading the ball joint housing from the threaded end of the inner rack. However, the housing is located within a section of the unibody of the vehicle at an area constricted by the lower control arm and strut rod connecting to the wheel and otherwise accessible only through a small port opening. Constriction at this area prohibits the use of a power tool to disengage the socket housing. Further, the area is constricted such that, although a manual tool, such as a wrench, may be used to unthread the rack and housing, the permitted angle of rotation of the tool is so small, less than ten degrees, that the tool must be repetitively moved through this small angle of rotation and repetitively engaged and disengaged to the housing before unthreading is accomplished. This is time consuming and it is not unusual that 45 minutes to two hours may be involved in disassembling the mechanism.

An object of the present invention is to provide a method and tool for disassembly and disengagement of the inner socket assembly of a rack and pinion mechanism with a tool, such as a power tool, applied remotely to the ball and socket housing. Another object of the present invention is to provide a method and tool permitting disassembly and disengagement of the inner socket assembly of a rack and pinion mechanism within a period of time substantially reduced from that required with known procedures for disassembling such assemblies. Finally, an object of the present invention is to provide a tool and method permitting the innersocket assembly of a rack and pinion mechanism to be easily disassembled and a method for easily extracting the parts to permit repair of the rack and pinion steering mechanism.

SUMMARY OF THE INVENTION

This invention is a method of disassembling the inner socket assembly from a rack and pinion mechanism. The assembly and mechanism comprise a rack having spaced apart open axial ends; a rack tube projecting through the rack axially thereof and having end projecting beyond an axial end, the projecting end having outwardly directed threads; a ball and socket joint housing, usually hexagonal in shape, with inward directed threads threaded with the outwardly directed threads of the rack tube end; a bulkhead within the housing dividing the housing into two chambers, a first chamber encompassing the threaded end of the rack tube, and a second chamber forming an inner socket; a tie rod with first ball-shaped end fitted within the inner socket to form a ball and socket joint and second end rotatably attached to a knuckle arm.

By method of the present invention, the inner socket assembly may be disassembled remotely by the application of a torque force. The application of a remote force permits the use of a power tool and permits application of a force at an area of free movement rather than application of a force at the immediate area of the ball and socket joint housing where movement is constricted and limited. The method comprises disengaging the tie rod from the knuckle arm; encircling the tie rod with an adapter socket sleeve; advancing the adapter socket sleeve transversely along the length of the tie rod from the knuckle joint end to the ball end at the ball and socket joint housing; engaging the ball and socket joint housing with a first end of the adapter socket sleeve; encircling the tie rod with an elongated, cylindrical shaft; advancing the elongated, cylindrical shaft transversely along the length of the tie rod from the knuckle joint end toward the ball and socket joint; engaging a first end of the cylindrical shaft to a second end of the adapter socket sleeve; and applying a torque force to the second end of the cylindrical shaft to rotate both the shaft and the adapter socket sleeve whereby the ball joint housing is rotated, loosened and removed from the rack tube. Further, in an embodiment of the invention, the rack tube has an annular groove toward the outwardly directed threads of the end and within the chamber of the ball joint housing, and the housing is fitted with a drive rivet driven through the wall of the housing and fitted into the annular groove of the axial end of the rack tube. In this embodiment, the method further comprises shearing the head of the drive rivet by wrenching the front end of the socket sleeve against the ball joint housing to shear the drive rivet to free it from the annular groove of the rack tube.

The tool of the present invention comprises an adapter socket sleeve having hexagonal bore opening at a first end for engaging fit over the hexagonal ball and socket joint housing, and adapter core at a second end; and elongated cylindrical shaft having hollow core for advancing the tool encircling the tie rod and transversely along the length of the tie rod from knuckle joint end toward the ball and socket joint and having adapter end for connection to a power tool and sleeve end for securely receiving the adapter core end of the socket sleeve to permit remote application of torque force of a power tool through the tool to said hexagonal housing.

DESCRIPTION OF THE DRAWINGS

FIG. 2 is a side view of the left front wheel of a vehicle.

FIG. 5 is a perspective view of the tool of the present invention.

FIG. 6 is a side view, cut-away to show the fit of the adapter socket sleeve encompassing the ball joint housing.

In FIGS. 1 and 2, generally, is shown the front end construction of a vehicle with power rack and pinion steering, including unibody 1, with outer fender 2, and inner fender 3, strut tower 4, firewall 5 between engine section 6 and passenger compartment 7 and front spoiler 8. Shown within engine section 6 are engine 9, strut assembly 10 and strut upper housing plate 11, power steering pump assembly 12, front grill assembly 13, and headlight assembly 14, power steering pump pully 15, oil filter 16, transmission 17, brake power booster 18, and master cylinder 19. The rack and pinion steering mechanism is shown, generally at 20, with inner socket assembly 21 between the steering mechanism 20 and tie rod assembly 22 connected to knuckle arm 24 and steering spindle 25. Clustered within the area of the inner socket assembly 21 and tie rod assembly 22 are brake rotor 26 and brake caliper 23, lower control arm 27 of the strut rod, sway stabilizer bar 28, and power steering pump assembly hose 29. Tie rod assembly 22 extends through port 30 in unibody 1 to attach to knuckle arm 24.

FIG. 3 shows the rack and pinion steering mechanism 20, tie rod assembly 22, knuckle arm 24, and steering spindle 25 and wheel 23 (in phantom) along with tool 31. FIG. 4 is a cut-away perspective view of the connection between steering mechanism 20 and tie rod assembly 22. With reference to FIG. 3 and 4, steering mechanism 20 has gear housing 32. encompassing pinion 33, with teeth 34, for engagement with teeth 35 of inner rack tube 36, which projects through and, upon rotation of pinion 33, is slidable through outer rack casing 37 having spaced apart axial ends 38 and 39. Inner rack tube 36 is further characterized by outwardly directed threads 40 and annular groove 41.

Figure 1:
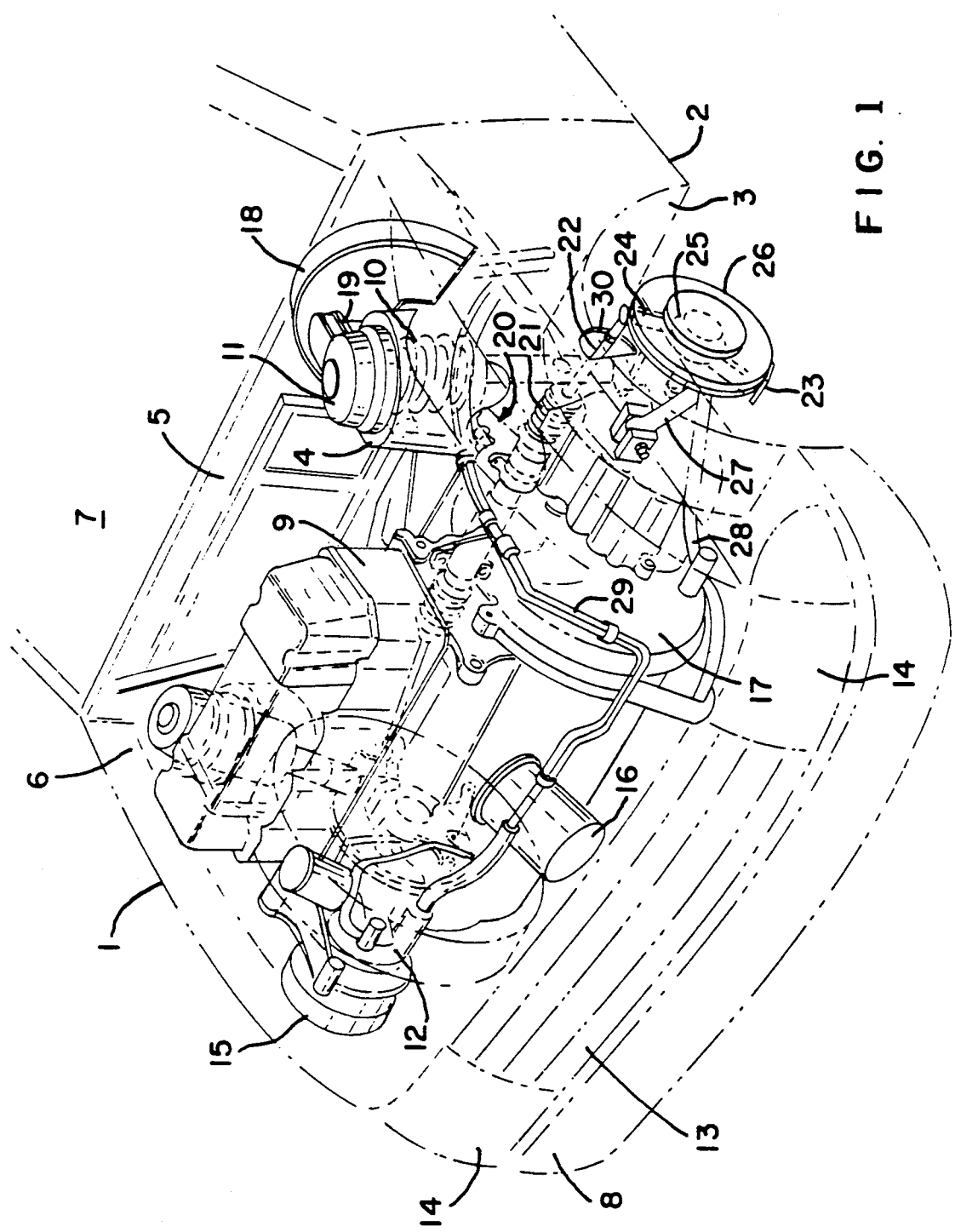
FIG. 1 is a perspective view of the front of a vehicle with rack and pinion steering showing the unibody construction in phantom.

Tie rod assembly 22 includes tie rod 42 with ball termination 43 at one end and outward threads 44 at the opposite end. Hexagonal ball and socket joint housing 45 encompasses the ball termination 43. Ball and socket joint housing 45 is separated into two chambers 46 and 47 by bulkhead 48. Chamber 47 accomodates ball termination 43, securing the ball but permitting rotation by the fit of annular flange 49. Ball and socket joint housing 45 has inward directed threads 50 and drilled hole 51. The end of inner rack tube 36 fits within chamber 46 and is secured by threading to the inward directed threads 50. Further, rivet 52 with head pin 53 protrudes through hole 51 to fit into annular groove 41 of inner rack tube 36 to prevent "backing off" of rack tube 36. Bellows boot 54 fits over the ball joint housing 45 and is secured by inner bellows clamp 55 and outer clamp 56.

Figure 3:
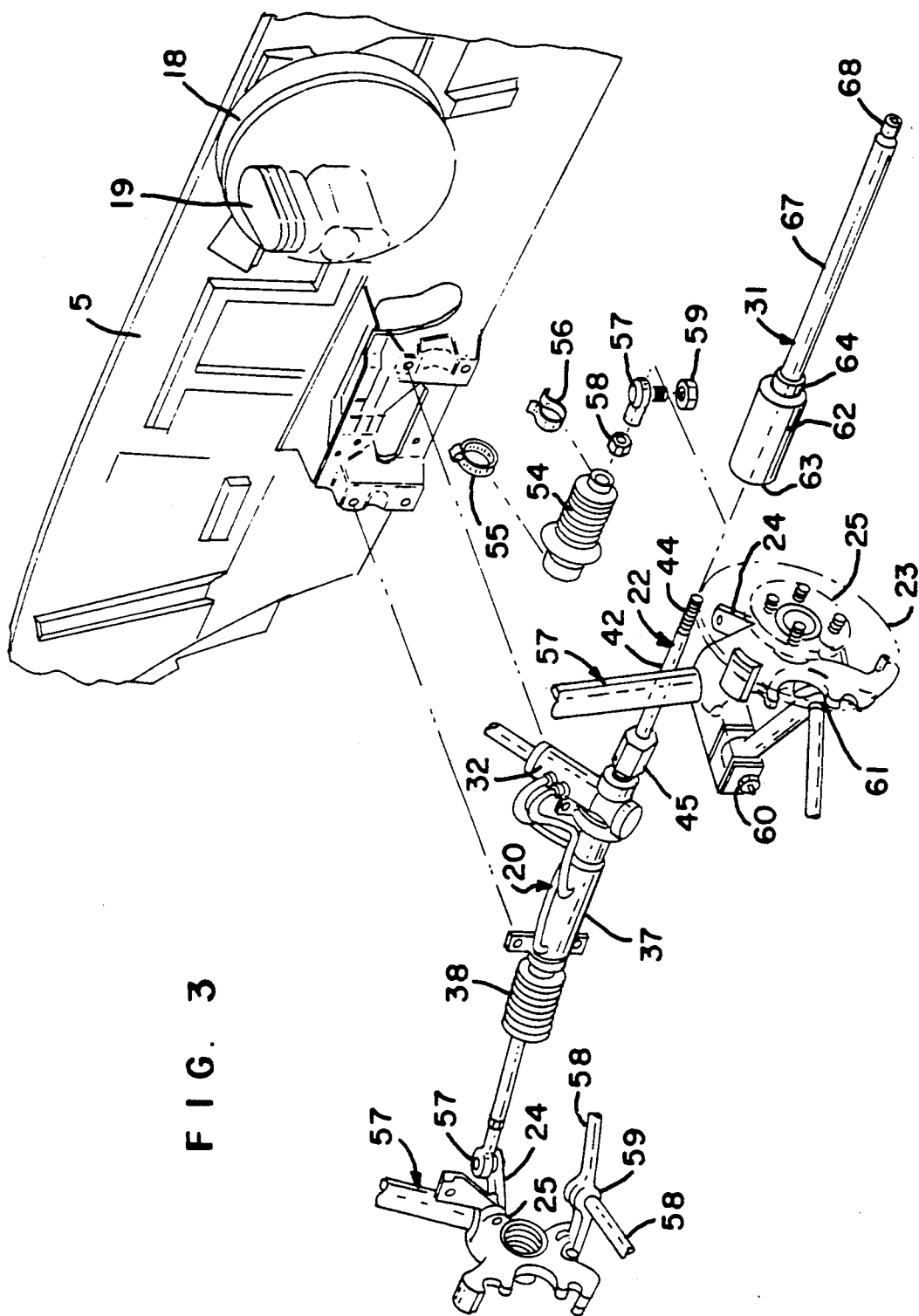
FIG. 3 is a perspective view, partially exploded, of a rack and pinion steering mechanism, inner socket assembly, steering knuckle and spindle, and wheel and the tool of the present invention.
Figure 4:
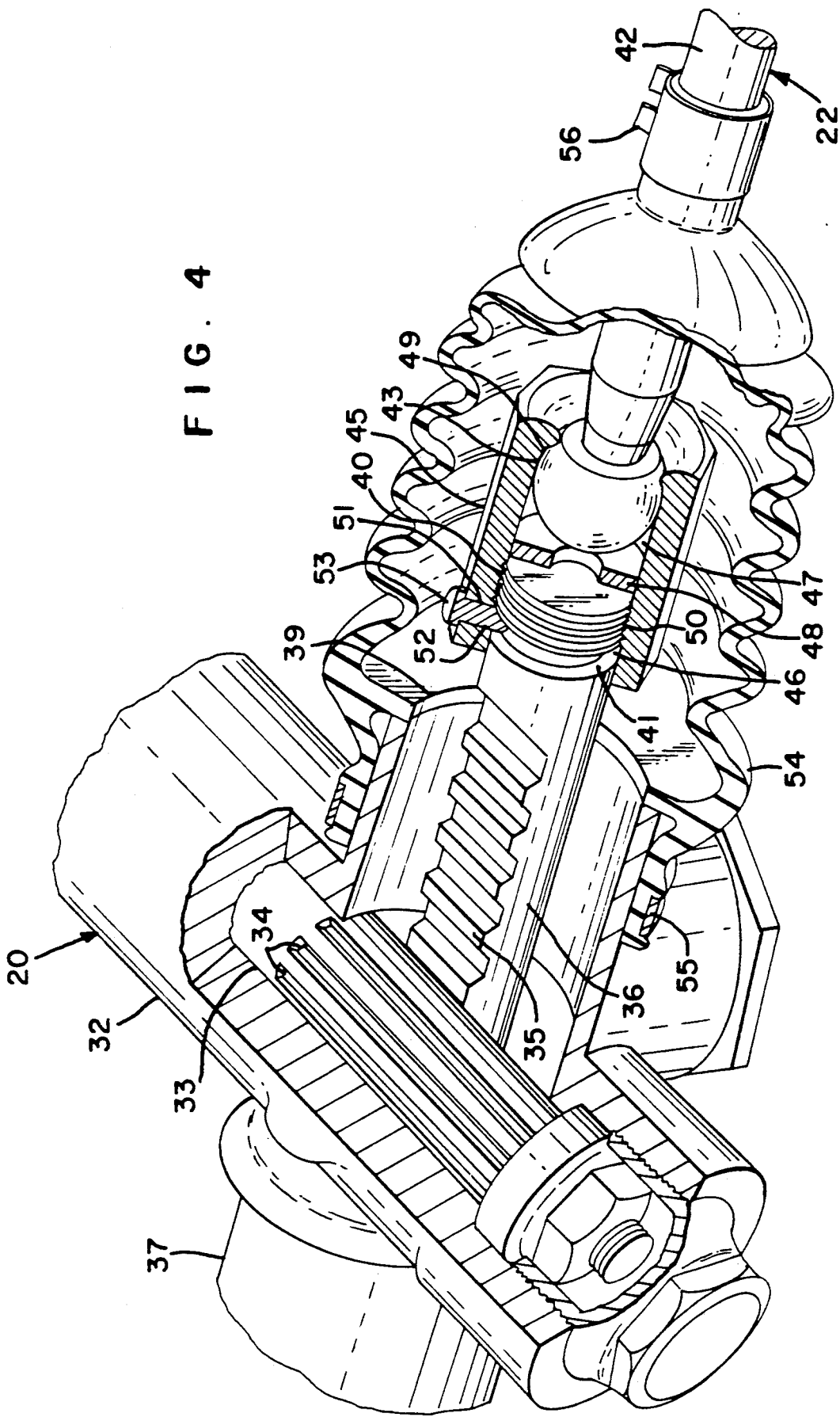
FIG. 4 is a cut-away perspective view of the connection between rack and tie rod.

In FIG. 3, tie rod end assembly 57, jam nut 58 and locknut 59 connect the tie rod assembly to knuckle arm 24 which in turn is connected to spindle 25 and wheel 23. Also shown in FIG. 3 is strut assembly 10 with strut rods 60 and strut rod bushing 61.

Referring to FIGS. 1, 2, 3, and 4, disengagement of the tie rod assembly 22 from the rack and pinion steering assembly 20 for the purpose of repair of either assembly requires unthreading the ball joint housing 45 from the threaded end 40 of the inner rack tube 36. Port 30 provides opening for extension of the tie rod assembly 22 through inner fender 3 of unibody 1 to wheel 23, and wheel 23 may be turned to cause a maximum extension of tie rod assembly 22 through port 30 to provide sufficient access to permit removal of the inner socket assembly bellows boot 54. However, port 30 is insufficient in size to allow access to disengage the inner socket assembly 21 itself.

Further, the ball and socket joint housing 45 is located within a section of the unibody 1 of the vehicle at an area constricted by the lower control arm 27, stabilizer bar bushing 61, control arm 27, power steering pump assembly hose 29, wheel 23 and brake rotor 26. Constriction in this area is such that there is insufficient room to permit use of a power tool to disassemble the ball and socket housing. Although a manual tool, such as a wrench, may be used, the permitted angle of rotation of the tool is so small, less than ten degrees, that the tool must be repetitively moved through this small angle of rotation and repetitively engaged and disengaged to the housing before disassembly is accomplished.

FIG. 3, 5 and 6 illustrate the tool 31 of the present invention and the method of utilizing the tool 31 to permit disassembling of the inner socket assembly 21 from a rack and pinion mechanism 20 by use of a power tool. Tool 31 comprises an adapter socket sleeve 62 having hexagonal bore opening 63 at a first end 64 and adapter core 65 at a second end 66. Elongated cylindrical shaft 67 has adapter end 68 and sleeve end 69.

In operation, the tie rod 42 is disengaged from strut rod 60 and the bellows boot 54 is removed from around the hexagonal ball and socket housing 45. This may be achieved through the port 30 through the inner fender 3 of the unibody 1. However, it is impossible, as indicated above, to disengage the inner socket assembly 21 from the rack and pinion mechanism 20 through this port or from beneath the carriage of the vehicle by use of a power tool. With the present invention, the tie rod 42 is encircled with the adapter socket sleeve 62 of the tool 31, and the sleeve 62 is advanced along the length of tie rod 42 from the knuckle arm 24 end to the ball termination end 43 to engage hexagonal bore opening 63 around and to hexagonal housing 45. The elongated cylindrical shaft 67 is then encircled around the tie rod 42 and is advanced along its length, again, from the knuckle 24 end toward the ball and socket joint 45. The adapter core end 65 of the socket sleeve 62 is securely received within a sleeve end 69 of the shaft 67. A power tool (not shown) is then fitted to adapter end 68 of shaft 67; and tool activated to thereby apply a torque force to the elongated cylindrical shaft 67. The torque force is translated along the shaft 67 to the adapter socket sleeve 62 and is applied to the ball and socket joint housing 45. Initial application of torque force shears the head pin 53 of drive rivet 52 by a wrenching action to free the drive rivet 52 from the annular groove 41 of the rack tube 36. Further, remote application of the power tool torque force unthreads the hexagonal housing 45 from the threads 40 of the inner rack tube 36 permitting removal of the inner socket assembly of ball and socket housing 45 and tie rod 42.

Because the invention can take numerous forms, it should be understood that the invention is limited only insofar as is required by the scope of the following claims:

I claim:

1. A method of disassembling an inner socket assembly from a rack and pinion mechanism, the assembly and mechanism comprising a rack having spaced-apart open axial ends; a rack tube projecting through the rack axially thereof and having end projecting beyond an axial end, said projecting end having outwardly directed threads; a ball and socket joint housing with inward directed threads threaded with said outwardly directed threads of the rack tube end; a bulkhead within the housing dividing the housing into two chambers, a first chamber encompassing the threaded end of the rack tube, and a second chamber forming an inner socket; a tie rod with first ball shaped end fitted within said inner socket to form a ball and socket joint and second end rotatably attached to a knuckle arm; the method comprising:

disengaging the tie rod from the knuckle arm;
encircling the tie rod with an adapter socket sleeve;
advancing the adapter socket sleeve transversely along the length of the tie rod from the knuckle joint end to the ball end at the ball and socket joint housing;
engaging the ball and socket joint housing with a first end of the adapter socket sleeve;
encircling the tie rod with an elongated cylindrical shaft;
advancing the elongated cylindrical shaft transversely along the length of the tie rod from the knuckle joint end toward said ball and socket joint;
engaging a first end of the cylindrical shaft to a second end of the said adapter socket sleeve; and
applying a torque force to the second end of the cylindrical shaft to rotate both said shaft and adapter socket sleeve whereby the ball joint housing is rotated, loosened and removed from the rack tube.

2. The method of claim 1 wherein said rack tube has an annular groove toward the outwardly directed threads of said end and within the chamber of the ball joint housing and said housing is fitted with a drive rivet comprising body and head with head exposed to the exterior of said housing and with said body driven through the wall of the housing and fitted into the annular groove of the axial end of the rack tube; said method further comprising:

shearing the head of the drive rivet by wrenching the front end of said socket sleeve against the housing to shear the drive rivet and to free the rivet from the annular groove of the rack tube.

3. The method of claim 1 wherein the ball and socket joint housing is hexagonal in shape.

4. The method of claim 2 wherein the ball and socket joint housing is hexagonal in shape.

5. The method of claim 1 wherein the ball and socket joint is covered by a bellows boot and said method comprises, before the step of disengaging the tie rod from the knuckle arm, the step of:

removing the bellow boot to expose the ball and socket joint housing.

6. The method of claim 2 wherein the ball and socket joint is covered by a bellows boot and said method comprises, before the step of disengaging the tie rod from the knuckle arm, the step of:

removing the bellows boot to expose the ball and socket joint housing.

* * * * *